United States Patent [19]
Isbrandt et al.
[11] Patent Number: 4,567,133
[45] Date of Patent: Jan. 28, 1986

[54] FILM FOR THERMAL IMAGING

[75] Inventors: Russell R. Isbrandt, White Bear Township, Ramsey County; Chung I. Young, Roseville, both of Minn.

[73] Assignee: Minnesota Mining and Manufacturing Company, St. Paul, Minn.

[21] Appl. No.: 622,951

[22] Filed: Jun. 26, 1984

Related U.S. Application Data

[63] Continuation-in-part of Ser. No. 520,207, Aug. 4, 1983, abandoned.

[51] Int. Cl.[4] .......................... B05D 3/02; B32B 27/38

[52] U.S. Cl. .................................... 430/348; 430/332; 428/413; 428/447; 428/913; 427/407.1; 427/412.5; 528/18; 528/19; 528/23; 528/31; 528/34

[58] Field of Search ........................ 428/447, 913, 413; 427/412.5, 407.1; 430/350, 332, 346, 336, 348; 528/18, 19, 23, 31, 34

[56] References Cited

U.S. PATENT DOCUMENTS

| | | | |
|---|---|---|---|
| 3,061,567 | 10/1962 | Keil | 260/29.2 |
| 3,694,247 | 9/1972 | Desjarlais | 428/913 X |
| 3,814,731 | 6/1974 | Nitzsche | 260/46.5 |
| 3,928,629 | 12/1975 | Chandra et al. | 427/387 |
| 3,936,581 | 2/1976 | Garden | 428/447 |
| 3,955,035 | 5/1976 | Ito et al. | 428/334 |
| 3,986,997 | 10/1976 | Clark | 260/29.2 |
| 4,019,904 | 4/1977 | Noshiro et al. | 96/33 |
| 4,049,861 | 9/1977 | Nozari | 427/412.5 X |
| 4,071,644 | 1/1978 | Grenoble et al. | 427/302 |
| 4,184,873 | 1/1980 | Noshiro et al. | 430/258 |
| 4,223,072 | 9/1980 | Baney et al. | 428/412 |
| 4,313,988 | 2/1982 | Koshar et al. | 428/40 |
| 4,336,323 | 6/1982 | Winslow | 428/913 X |

*Primary Examiner*—Joseph L. Schofer
*Assistant Examiner*—Fred M. Teskin
*Attorney, Agent, or Firm*—Donald M. Sell; James A. Smith; David L. Weinstein

[57] ABSTRACT

Thermally imageable film comprising a polymeric substrate, a layer of imageable material coated over at least one major surface thereof, and a release coating coated over the layer of imageable material. The release coating is an organopolysiloxane applied from a composition which is curable at temperatures below about 70° C. with a curing exposure time of under about 3 minutes, thereby preventing adverse effects upon the layer of imageable material.

13 Claims, No Drawings

FILM FOR THERMAL IMAGING

This application is a continuation-in-part of U.S. patent application Ser. No. 520,207, filed Aug. 4, 1983, now abandoned.

BACKGROUND OF THE INVENTION

This invention relates to thermally imageable films, and to a release coating for such films.

Infrared imaging is a form of thermal imaging that involves the use of a focused infrared lamp to heat an infrared absorbing image, commonly referred to as the "original", which image is in contact with a substrate, e.g., a transparent polymeric film, having thermally sensitive imaging chemicals applied to a major surface thereof. Upon image-wise absorbing the focused infrared radiation, the original transfers the absorbed heat to the thermally sensitive imaging chemicals on the surface of the substrate, thereby causing a chemical reaction which results in the formation of a copy of the image of the original on the substrate.

It is frequently desirable to prepare projection transparencies, e.g. transparencies for overhead projectors, from originals which are actually plain paper copies that have previously been prepared from electrophotographic imaging processes. The electrostatic latent image on such a plain paper copy is developed by the application and fixing of toner powder to the plain paper copy. Toner powder is generally a blend of polmer having low melting point, and carbon. When the toner on the surface of a plain paper copy in contact with the substrate from which the projection transparency is to be prepared absorbs infrared radiation, partial remelting of the toner powder on the copy is likely to occur. The portions of the original which bear the remelted toner powder will frequently adhere to the transparency. When the original is separated from the transparency, toner powder from the original is likely to be removed from said original and simultaneously transferred to the surface of the thus-formed projection transparency. This transfer of toner powder reduces the optical density of the image on the original and may, in effect, destroy the quality of the image. Thus, the original can be damaged when a projection transparency is made from it. The adherence of the toner powder to the projection transparency may also result in undesirable effects on the surface of the transparency itself. When the image formed on the surface of the transparency is black, the toner powder does not harm the image itself, but the powder may be rubbed off the transparency and transfer to surfaces which subsequently come in contact with the transparency. When the image formed on the transparency is a color, the toner powder can cause the colored image to have irregular black spots in the colored image area. This is considered to be a major defect in the transparency. A barrier film interposed between the imageable layer of the transparency and the original can prevent toner powder from being picked up and retained by the transparency. In a type of color transparency currently in use, a film containing an acid does serve as such a barrier.

In addition to the foregoing problems, certain imageable materials tend to liberate moisture upon exposure to heat or infrared radiation. This moisture liberation results in formation of opaque areas, i.e. "halos", around the edges of the images. These areas scatter light and project as darkness around the image.

Ito, et al, U.S. Pat. No. 3,955,035 discloses a trialkoxy silane coating which imparts abrasion resistance, hardness, and release properties to plastics. This coating, however, is brittle and will crack if applied to a flexible polyester substrate of the type commonly used for preparing transparencies. Clark, U.S. Pat. No. 3,986,997 discloses a coating formed from a dispersion of colloidal silica in a condensate of methyl trihydroxy silane. This coating is also brittle, and, thus, it is unsuitable for flexible sheeting. Baney, et al, U.S. Pat. No. 4,223,072 discloses a coating formed of phenyl trihydroxy silane. Although this coating exhibits flexibility superior to that of the coating disclosed in the Clark patent, the flexibility is insufficient to allow coating on thin polyester films. Grenoble, U.S. Pat. No. 4,071,644 discloses a flexible sheet material coated with siloxanes which is useful as a non-adherent surface. The coating composition in this patent comprises vinyl alkyl siloxane oligomers, alkyl hydrogen siloxanes, and a catalyst. These coatings are curable at 250° F. (121° C.), a temperature at which a temperature sensitive coating such as that required for infrared imageable films and thermally imageable films would react prematurely. Garden, et al, U.S. Pat. No. 3,936,581 discloses a release coating containing vinyl siloxanes in mixture with alkyl hydrogen siloxanes and a platinum catalyst. The optimum cure temperatures are in excess of 100° C., a temperature which would bring about premature reaction of the temperature sensitive coatings of infrared imageable films.

SUMMARY OF THE INVENTION

This invention involves a film suitable for thermal imaging which comprises (1) a substrate formed from a flexible material, (2) a layer of thermally imageable material applied to at least one major surface of the substrate, and (3) a cured organopolysiloxane release coating overlying the layer of imageable material. The release coating is a cured silicone polymer prepared from a composition comprising (1) at least one curable polysiloxane or epoxypolysiloxane, and (2) a catalyst.

The preferred release coating is prepared from a composition comprising (1) a curable polysiloxane, (2) a catalyst, (3) a cross-linking agent, (4) a fast-cure additive, and (5) an anchorage additive.

The release coating composition can be applied to the imaging film by conventional means and cured at temperatures sufficiently low so as to prevent adverse effects upon the layer of imageable material. The release coating is also sufficiently permeable so as to allow moisture to escape from the imageable layer, thereby reducing the "halo" effect. In addition, the coating is sufficiently flexible so that the film bearing it can be imaged in commercially available infrared copying machines, e.g., 3M Model 45 infrared copier. Toner powder from plain paper copies will not stick to this coating when the imaging film is processed in a conventional thermal imaging apparatus, e.g., an infrared copier.

DETAILED DESCRIPTION

The type of film contemplated for use in the present invention is any imaging film which can be imaged by being exposed to thermal energy, e.g. infrared radiation, while in surface-to-surface contact with an original.

A particularly appropriate type of thermally imageable film contemplated for use in the present invention is described in Isbrandt, et al, U.S. patent application Ser. No. 352,053, filed Feb. 24, 1982, now U.S. Pat. No.

4,423,139 incorporated herein by reference. This film can be imaged by means of infrared radiation. This film comprises a polymeric film substrate transparent to visible light, bearing an imageable layer on at least one surface thereof. Substrate materials which are suitable for this invention include polycarbonates, polyesters, polyacrylates, polystyrene, and polypropylene. A preferred substrate is polyvinylidene chloride primed polyester film. The preferred polyester is polyethylene terephthalate.

The imageable layer comprises a nitrate salt, e.g., nickel nitrate, at least one leuco dye, e.g., 3,7-di(N,N-diethylamino)10-benzoyl phenoxazine, and a binder, e.g., cellulose acetate butyrate, one or more aromatic compounds which form quinones, diimines, or quinonimes upon oxidation, e.g., catechol, and 1-phenyl-3-pyrazolidinone or derivatives thereof. The layer can also contain a material which supplies hydrogen ions, e.g., an acidic material such as phthalic acid. Upon the application of a sufficient amount of thermal energy, the nitrate salt will oxidize the leuco dye, resulting in a change in color.

Other thermally imageable films that are suitable for use in the present invention are described in Owen, U.S. Pat. No. 2,910,277; Grant, U.S. Pat. No. 3,080,254; and Newman et al, U.S. Pat. No. 3,682,684, all of which are incorporated herein by reference. Owen describes a heat-sensitive chemically reactive copy-sheet comprising a thin flexible carrier web coated with a visibly heat-sensitive coating comprising (1) a film-forming binder, (2) a noble metal salt of an organic acid, and (3) a cyclic organic reducing agent for the noble metal ions, having an active hydrogen atom attached to an atom which is selected from the class of oxygen, nitrogen and carbon atoms and is directly attached to an atom of the cyclic ring. Grant describes a heat-sensitive copy sheet comprising the same ingredients as contained in Owen and further including a sufficient amount of phthalazine to cause observable darkening of the thermographic image. In both Owen and Grant, the preferred film-forming binder is polystyrene resin, the preferred noble metal salts of organic acid are silver behenate and silver stearate, and the preferred reducing agents are 3,4-dihydroxybenzoic acid and methyl gallate. Newman et al describes a heat-sensitive sheet material including a thin visibly heat-sensitive layer having wide exposure latitude and comprising a mixture of ferric and silver soaps of long chain fatty acids, a toner for the silver image, and a phenolic co-reactant for the soaps. An example of ferric and silver soap mixture is ferric stearate and silver behenate. An example of a toner is phthalazinone, and examples of phenolic co-reactants for the soaps are pyrogallic acid, catechol, 3,4-dihydroxybenzoic acid, methyl gallate, and behenoyl pyrogallol.

Compositions for preparing the organopolysiloxane coatings suitable for the present invention must be curable at temperatures under 70° C. with an exposure time of under 3 minutes. Longer cure times or higher curing temperatures or both would be detrimental to the imaging chemistry of the thermal imaging system.

Organopolysiloxanes suitable for the present invention include hydroxy-terminated or alkoxy-terminated polyalkylsiloxanes, for example, organopolysiloxane obtained by curing a mixture of siloxanes consisting essentially of from 0.1 to 3% by weight of methylhydrogenpolysiloxane and from 97 to 99.9% by weight of a siloxane of the formula $$(CH_3)_xSiO_{\frac{4-x}{2}}$$

in which x has a value from 1.9 to 2 inclusive and in which siloxane substantially all of the molecules have attached thereto at least a total of two silicon-bonded hydroxyl groups and/or alkoxy groups of less than 5 carbon atoms, as described in U.S. Pat. No. 3,061,567, the disclosure of which is incorporated herein by reference; cured epoxypolysiloxanes and their blends with epoxy-terminated silanes, as disclosed in U.S. Pat. No. 4,313,988, the disclosure of which is incorporated herein by reference.

Organopolysiloxanes of the type disclosed in U.S. Pat. No. 3,061,567 can be prepared from compositions comprising (1) a silicone resin, (2) a catalyst, (3) a cross-linking agent, and, optionally, a fast-cure additive, and an anchorage additive.

A commercially available silicone resin which has been found to be useful for this invention is Syl-off® 294, which is available from Dow Corning Corporation.

Catalysts are desirable for reducing the time required and heat input necessary to cure the aforementioned silicone resins. Catalysts useful in the practice of this invention include dialkyltin salts, wherein the alkyl groups contain from 1 to 6 carbon atoms. Catalysts that are preferred are represented by the following general formula:

$$(C_4H_9)_2Sn(O\overset{\overset{O}{\|}}{C}R)_2$$

wherein R is $-CH(C_2H_5)(CH_2)_3CH_3$, $-CH_3$, or $-(CH_2)_{10}CH_3$.

Commercially available catalysts which have been found to be useful in the practice of this invention include Dow Corning® 23A and Dow Corning® XY-176, both of which are available from Dow Corning Corporation, dibutyltin diacetate available from Alfa Products, and dibutyltin dilaurate, available from Alfa Products and MCB Reagents.

Cross-linking agents can advantageously be employed for promoting cure. Cross-linking agents suitable for the aforementioned silicone resins include orthosilicates, few example, tetramethoxyethoxyethylsilicate.

Commercially available cross-linking agents which have been found to be useful in the practice of this invention include Dow Corning® C4-2117, available from Dow Corning Corporation, tetraethoxysilane, available from Alfa Products, tetrapropoxysilane, available from PCR Research Chemicals. Dow Corning® C4-2117 has the following formula:

$$Si(-O-CH_2-CH_2-OCH_2CH_2-OCH_3)_4$$

An anchorage additive can also be added to the silicone resin-containing composition to improve the adhesion of the coating to the substrate. A commercially available anchorage additive is Syl-off® 297, available from Dow Corning Corporation. This additive also is useful for increasing the pot life of the catalyzed coating composition formulation. Other pot-life extenders include anhydrous alcohols, ketones, and acetic acid. Representative examples of anhydrous alcohols are methanol, ethanol, and isopropanol. Representative examples of ketones are methyl ethyl ketone and methyl isopropyl ketone.

Syl-off ® 297 has the following formula:

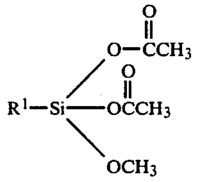

wherein $R^1$ is a long chain molecule ending in

or C═C. Preferably $R^1$ contains from 1 to 5 carbon atoms.

The concentration of each ingredient can vary, the particular amount of each depending upon the combination of properties needed, as explained hereinafter.

When employing Syl-off ® 294 resin, it is preferred that the resin be dissolved in an aliphatic or aromatic solvent, such as, for example, heptane, VM & P naphtha, toluene, and blends of toluene and heptane. Some surfaces such as polyethylene may call for high levels of aliphatic solvents to obtain uniform wetting. It is preferred that the coating composition formulation, hereinafter alternatively referred to as coating bath, contain from 2 to 10 percent by weight silicone. The level of catalyst can vary, depending upon the curing temperature and time desired. When Dow Corning ® 23A catalyst is used with Syl-off ® 294 resin, it is preferred that the concentration of catalyst be from 10 to 30 percent by weight, more preferably 10 to 18 percent by weight, based on weight of silicone solids; when Dow Corning ® XY-176 catalyst is used with Syl-off ® 294 resin, it is preferred that 5 to 15 percent by weight catalyst, based on weight of silicone solids, be employed. When accelerated cure is desired, Dow Corning ® C4-2117 fast cure additive can be used at a level of 5 to 20 percent by weight, preferably 8 to 17 percent by weight, based on weight of silicone solids. If Dow Corning ® C4-2117 fast cure additive is used, either 3 to 8 percent by weight, based on weight of silicone solids, of Syl-off ® 297 anchorage additive or 1 to 5 percent by weight anhydrous alcohol, based on weight of total coating solution, should be used as a potlife extender.

The ingredients for preparing the curable silicone polymer composition can be combined by introducing them into a vessel, and mixing them by any suitable method, such as, for example, stirring. Because of possible too rapid reaction of fast-cure additive, e.g. Dow Corning ® C4-2117, with catalyst, e.g. Dow Corning ® XY-176, the fast-cure additive should be added and mixed well before addition of catalyst.

The composition can be applied to the surface of the imaging film by any of the techniques known in the art, such as, for example, knife coating, Mayer rod coating, curtain coating, extrusion bar coating, and rotogravure coating. The composition is coated over the surface of the film bearing the imageable layer formulation, thus acting as a top coat. The composition is preferably applied to the surface of the imaging film by coating from an organic solvent. However, solventless coating is an acceptable method when using the squeeze roll coating technique.

Catalyst and cross-linking agents are critical in that proper selection thereof will permit coating by means of efficient methods, such as, for example rotogravure and reverse roll.

Phthalic acid and catechol present in the imaging chemistry tend to inhibit the cure of the release coating. Generally, a long dry time for the imaging chemistry allows for adequate cure, but a short dry time for that layer reduces the likelihood of adequate cure. The additives employed with the formulation for preparing the release coating help to promote a faster cure and improved anchorage.

Epoxysiloxane polymers of the type disclosed in U.S. Pat. No. 4,313,988 are represented by the formula,

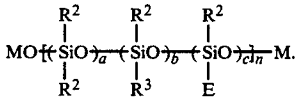

wherein $R^2$ is a lower alkyl group of one to three carbon atoms, $R^3$ is a monovalent hydrocarbon radical of 4 to 20 carbon atoms, E is a monovalent epoxy-containing hydrocarbon radical, M is a silyl group $R_3{}^2Si$—, $R_2{}^2R^3Si$— or $R_2{}^2ESi$—, where $R^2$, $R^3$, and E are defined above, a is 5 to 200, b is 0 or up to 20% of a, a+b is 5 to 200, c may be 0 when M is $R_2{}^2ESi$— or greater than 0 but less than 20% of the value of a (a+b) when M is $R_3{}^2Si$—, $R_2{}^2R^3Si$— or $R_2{}^2ESi$—, and n is 1 to 75. In the above formula, the preferred R group is methyl, and the preferred M group is $R_2{}^2ESi$— when c is 0, and $R_3{}^2Si$— when c is greater than 0. Also, when c is 0 and M is $R_2{}^2ESi$—, n is 1 to 5, and preferably n is 1 or 2. The preferred b is 0.

Illustrative examples of the monovalent hydrocarbon radical, $R^3$, in the above formula are alkyl radicals such as butyl, isobutyl, tert-butyl, hexyl, octyl and octadecyl; aryl radicals such as phenyl, naphthyl and bisphenylyl; alkaryl radicals such as tolyl and xylyl; aralkyl radicals such as phenylmethyl, phenylpropyl and phenylhexyl; and cycloaliphatic radicals such as cyclopentyl, cyclohexyl and 3-cyclohexylpropyl; and ether oxygen- or ester oxygen-containing radicals such as ethoxypropyl, butoxybutyl, and ethoxycarbonylpropyl and the like. The preferred $R^3$ is alkyl of 4–8 carbon atoms.

The siloxane groups,

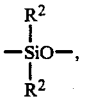, 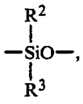, and 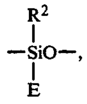, are ordered or randomly arranged in the epoxypolysiloxane and the monovalent epoxy-containing hydrocarbon radical, E, contains at least one polymerizable epoxy group.

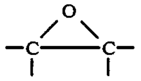

the remainder being composed of carbon and hydrogen, free of acetylenic unsaturation and in addition to the oxirane oxygen can contain ether, O, or carbonyl oxygen, e.g.,

Illustrative examples of E are:

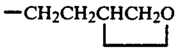

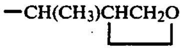

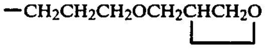
[i.e., gamma-glycidoxypropyl]

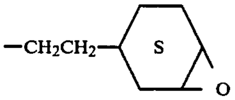
[i.e., beta-(3,4-epoxy-cyclohexyl)ethyl]

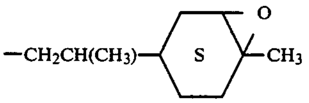

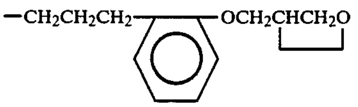

In the above epoxy-containing hydrocarbon radical, the epoxy group is preferably located at the terminal position of the radical, but it need not be a terminal group.

Epoxy-terminated silanes can be used optionally with the epoxypolysiloxanes in the coating formulation of this invention. Use of such epoxy-terminated silanes enables the release performance of the coating to be varied. These epoxy-terminated silanes are compounds or materials having polymerizable epoxy group(s) and a polymerizable silane group, the bridging of these groups being through a non-hydrolyzable aliphatic, aromatic or aromatic and aliphatic divalent hydrocarbon linkage which may contain ether or carbonyl oxygen linking groups. The epoxy-terminated silane is represented by the formula.

$$(E)_{4-p}Si(OR^4)_p$$

wherein E is an epoxy-containing monovalent hydrocarbon radical defined above, p is 1 to 3 (preferably 3) and $R^4$ can be an aliphatic hydrocarbon radical of less than 10 carbon atoms such as alkyl (methyl, ethyl, isopropyl, butyl), an alkenyl such a allyl or vinyl, or an acyl radical such as formyl, acetyl, or propionyl. Because of availability and performance, the preferred $R^4$ is a lower alkyl such as methyl or ethyl. Many illustrative examples are described in U.S. Pat. No. 4,049,861.

In addition to the silane, any hydrolyzate of the above silanes can be used. The hydrolyzate is formed by partial or complete hydrolysis of the silane $OR^4$ groups as described further in U.S. Pat. No. 4,049,861.

The amount of the epoxy-terminated silane or hydrolyzate can range from 0 to about 98% of the epoxypolysiloxane used, the amount being determined by the release performance desired. Generally, the higher amounts give the higher release values.

Curing of the epoxypolysiloxane-containing compositions of this invention can be effected by mixing with conventional epoxy curing catalysts and may additionally require heat or radiation. Examples of epoxy curing catalysts are tertiary amines, Lewis acids and their complexes, such as $BF_3$ and complexes with ethers and amines; antimony halide-phosphorus containing ester complexes, such as with organophosphonates, mentioned below; polyaromatic iodonium and sulfonium complex salts (e.g., having $SbF_6$, $SbF_5OH$, $PF_6$, $BF_4$, or $AsF_6$ anions, as disclosed in U.S. Pat. No. 4,101,513) and organic acids and their salts or other derivatives such as the highly fluorinated sulfonic and sulfonylic acids as described in U.S. Pat. No. 4,049,861. The presence of the catalyst in the cured composition does not affect its efficacy as a release material.

In the practice of this invention the epoxypolysiloxane, catalyst, and optionally, the epoxy-terminated silane are mixed in a solvent or, where possible, without solvent. The amount of catalyst used is about 1 to 5% by weight of the epoxy composition. The resultant material is coated on the imageable layer and cured at ambient temperatures or, where necessary, heated to bring about cure. Solvents which can be used include ethyl acetate, isopropyl acetate, acetone, methyl ethyl ketone, heptane, toluene, and mixtures thereof. The exact coating technique is not especially critical and any of several well known procedures can be used. Wirewound rods, such as a Mayer bar, or a rotogravure applicator roll having, for example, 80 lines per in, provide uniform coatings. Optionally, a mixing spray nozzle having a line for the epoxypolysiloxane fluid or solution and a separate line for the catalyst solution can be used.

The coating thickness of the organopolysiloxane release coating can be controlled to obtain optimum performance. Coating weights in excess of 2.1 $g/m^2$ tend to become soft and to deform upon exposure to heat. This deformation can lead to irregularities in image areas, resulting in light scattering, which in turn can produce dark spots in the projected image. The preferred range of coating weight is from about 0.108 $g/m^2$ to about 1.076 $g/m^2$. The most preferred range is from about 0.108 $g/m^2$ to about 0.538 $g/m^2$.

In some situations, a barrier coat must be interposed between the layer bearing the imaging chemicals and the release coating in order to permit the release coating to cure. An examples of a suitable substance for barrier coats is chlorinated polyisoprene (e.g., Parlon® S-20, commercially available from Hercules, Inc.).

As a formulation for preparing a release coating for thermally imageable films, the composition of this invention is superior to those in conventional use for the following reasons:

(1) the composition can be cured at temperatures below about 70° C., low enough to prevent damage to imaging chemistry;
(2) the composition can be coated with a high speed coating apparatus, e.g., rotogravure, reverse roll;
(3) the cured coating is sufficiently permeable to mosture, resulting in reduction of image edge haziness, or "ghosting";
(4) the cured coating allows better release than coatings currently used in the art;

(5) the cured coating has good release from toner powder with the result that toner powder will not adhere to the surface of the film.

The imaging film of the present invention is also quite useful in thermal printing devices, such as the Hewlett-Packard 9800 series. The thermal print heads are extremely hot, e.g., greater than 100° C., and they have a tendency of picking off the thermally imageable materials from the substrate, resulting in fouled print heads. The cohesive strength of the coating, combined with its low coefficient of friction, render it useful for separating the print head from the thermally imageable materials.

The following examples present specific illustrations of the present invention. It should be understood that the invention is not intended to be limited to specific details to be set forth therein.

EXAMPLE I

A composition for preparing a silicone polymer release coating was prepared from a formulation containing the following ingredients in the amounts indicated:

| Ingredient | Amount |
|---|---|
| Resin (Syl-off ® 294) | 4.00 g |
| Heptane | 32.80 g |
| Methyl ethyl ketone | 8.20 g |
| Cross-linking agent (Dow Corning ® Q2-7131) | 0.075 g |
| Catalyst (Dow Corning ® XY-176) | 0.150 g |

The composition was coated over the imageable layer of a sheet of transparent infrared imageable film by means of knife coating. The wet coating thickness was 2 mils (50.8 μm). The coating was dried at a temperature of 140° F. (60° C.) for 3 minutes.

In this and the following Examples II and III the transparent infrared imageable film was 4 mil (100 μm) thick polyethylene terephthalate sheet bearing on one major surface thereof an imageable layer coated from a formulation containing the following ingredients in the amounts indicated:

| Ingredient | Amount |
|---|---|
| Nickel nitrate [$Ni(NO_3)_2$] | 0.102 g |
| 2(2'-hydroxy-5'-methylphenyl)-benzotriazole | 0.100 g |
| 1(3-bromo-4N,N—dimethylamino-phenyl)-2(2'-5'-chloro-1',3',3'-trimethylindolyl)ethene | 0.084 g |
| Phthalic acid | 0.116 g |
| 1-Phenyl-3-pyrazolidinone | 0.102 g |
| Catechol | 0.007 g |

-continued

| Ingredient | Amount |
|---|---|
| Vinylidene chloride-acrylonitrile copolymer (Saran ® F-310, available from Dow Chemical Company) | 1.500 g |
| Wetting agent (Fluorad ® FC-430, fluorinated alkyl ester available from Minnesota Mining and Manufacturing Company) | 0.001 g |
| Tetrahydrofuran | 1.333 g |
| Methyl ethyl ketone | 4.980 g |

Prior to coating, the above formulation was scaled-up 1500X and rotogravure coated with a 79.4 lines/in. knurl at 125 ft/min, with an oven dwell time of 68 seconds at a temperature of 180° F. (82° C.).

Identical plain paper copies were employed as originals to determine the relative amount of toner adhering to the infrared imaging film. The effectiveness of the silicone release coating was measured by comparing the optical density values on release coated and uncoated film from the same lot. The optical densities were measured with a MacBeth Model TD504AM densitometer. The images were made on a 3M Model 45 infrared transparency maker. The treated and untreated film samples were fed through the transparency maker side-by-side so that both were exposed to identical conditions. Uncoated polyester film was used as a control. The results are set forth in Table I:

TABLE I

| | | | Treated film | | Untreated film | | Untreated polyester film | | Treated polyester film | |
|---|---|---|---|---|---|---|---|---|---|---|
| Sample | Source of electrophotographic copy | Number of samples averaged | optical density | standard deviation | optical density | standard deviation | optical density | standard deviation | optical density | standard deviation |
| A | Printed | 11 | 1.31 | 0.03 | 1.33 | 0.02 | 0.03 | 0.00 | — | — |
| B | 3M Secretary III | 10 | 1.36 | 0.02 | 1.42 | 0.04 | — | — | — | — |
| C | IBM III | 12 | 1.35 | 0.02 | 1.45 | 0.05 | 0.06 | 0.02 | 0.03 | 0.005 |
| D | Kodak 150 | 10 | 1.33 | 0.03 | 1.46* | 0.09 | — | — | — | — |
| E | Sharpfax SF 811 | 10 | 1.34 | 0.03 | 1.64* | 0.57 | — | — | — | — |

*Originals adhered so strongly to the untreated film that tearing and destruction of the original occurred upon separation of the original from the film after imaging.

Untreated infrared imageable film, i.e., film not having a release coating, should remove more toner from an original, i.e., a plain paper copy bearing removable toner powder, than should an infrared imageable film treated with the release coating of the present invention. The toner which adheres to the untreated film will block light and thereby raise the transmission optical density readings. Untreated imageable film and treated imageable film should give the same optical density readings when the image is prepared from a printed original, i.e. an original having no removable toner, assuming that the films are selected from the same lot. This was indeed true (See Sample A, Table I). When untreated polyester film having no image receiving layer was used, only the base optical density of the film should was observed (See Sample A, Table I). When a plain paper copy original having removable toner was used to produce a transparency with untreated polyester film having no image receiving layer, an image resulting from removed toner was observed and measured (See Sample C, Table I).

A transparency prepared from a toned original and an infrared imageable film treated with an effective toner release coating should exhibit a lower optical density reading than a transparency prepared from a toned original and an untreated infrared imageable film from the same lot, solely due to the absence of adhering toner material on the treated film. This was shown to be true in Samples B, C, D, and E of Table I. Furthermore, because toner deposition on the untreated film was not uniform, the standard deviation of the average image density readings was greater for the untreated films than for the treated films. (See Samples B, C, D, and E of Table I). In contrast, standard deviations calculated for transparencies prepared from printed originals were approximately the same for both treated and untreated films (See Sample A, Table I).

EXAMPLE II

This example demonstrates that only certain classes of silicone resins are suitable for use in the present invention.

The following table sets forth ingredients and amounts for four different release coating formulations:

TABLE II

| Ingredient | Amount A (g) | B (g) | C (g) | D (g) |
|---|---|---|---|---|
| Resin | | | | |
| Syl-off ® 294 | 3.124 | | | |
| Syl-off ® 23 | | 10.000 | | |
| Syl-off ® 291 | | | 2.500 | |
| Syl-off ® 292 | | | | 8.350 |
| Fast-cure additive | | | | |
| Dow Corning ® C4-2117 | 0.300 | 0.300 | 0.300 | 0.250 |
| Anchorage additive | | | | |
| Syl-off ® 297 | 0.200 | 0.150 | 0.200 | 0.100 |
| Catalyst | | | | |
| Dow Corning ® XY-176 | 0.300 | 0.300 | 0.300 | |
| Dow Corning ® 23A | | | | 0.650 |
| Solvent | | | | |
| Isopropanol | 3.221 | 3.925 | 4.670 | 4.650 |
| Methyl ethyl ketone | 1.074 | | | |
| Heptane | 38.655 | 35.325 | 42.030 | 36.585 |

Each formulation was coated over the imageable layer of a sheet of transparent infrared imageable film by means of knife coating. The wet coating thickness was 2 mils (50.8 μm). The following table sets forth cure results for the previously mentioned release coating formulations.

TABLE III

| Formulation | Temperature (°C.) | Time (sec) | Nature of cure |
|---|---|---|---|
| A | 68 | 60 | Good |
| B | 82 | 90 | Good |
| C | 77 | 90 | Good |
| D | 82 | 90 | None |

Formulation D did not cure at 82° C. because Dow Corning ® 23A catalyst requires a higher curing temperature than does Dow Corning ® XY-176 catalyst. Of the three formulations wherein cure was effected, only formulation A could be cured at a temperature below 70° C. Formulations B and C would not be suitable for use in the present invention because the temperatures required to cure the release coating formulation would adversely affect the layer of imageable material.

EXAMPLE III

A composition for preparing an epoxysiloxane release coating was prepared from a formulation containing the following ingredients in the amounts indicated:

| Ingredient | Amount |
|---|---|
| 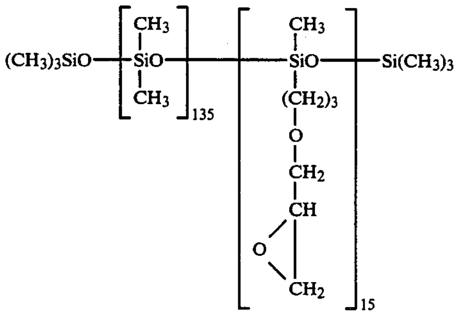 | 3.0 g |
| Heptane | 37.6 g |
| Methyl ethyl ketone | 9.4 g |
| Antimony pentachloride/dimethylmethyl phosphonate complex | 0.3 g |

The composition was coated over the imageable layer of a sheet of infrared imageable film by means of knife coating. The wet coating thickness was 2 mils (50.8 m). The coating was dried at a temperature of 150° F. (66° C.) for 1½ minutes.

The effectiveness of the epoxypolysiloxane release coating was determined by the same procedures and with the same equipment as used in Example I. The results are set forth in Table IV:

TABLE IV

| Sample | Source of electro-photographic copy | Number of samples averaged | Treated film optical density | Treated film standard deviation | Untreated film optical density | Untreated film standard deviation |
|---|---|---|---|---|---|---|
| A | Printed | 10 | 1.33 | 0.01 | 1.28 | 0.01 |
| B | 3M Secretary III | 10 | 1.32 | 0.03 | 1.60 | 0.10 |
| C | IBM III | 10 | 1.34 | 0.04 | 1.46 | 0.09 |
| D | Kodak 150 | 9 | 1.36 | 0.02 | 1.45* | 0.05 |
| E | Sharpfax SF 811 | 10 | 1.34 | 0.04 | 1.80* | 0.69 |

*Originals adhered so strongly to the untreated film that tearing and destruction of the original occurred upon separation of the original from the film after imaging.

From Table IV, it is apparent that untreated infrared imageable film removed more toner from an original than did an infrared imageable film treated with an epoxypolysiloxane release coating. In addition, standard deviation values of average image density readings were greater for untreated films than for treated films.

EXAMPLE IV

In this example, the transparent thermally imageable film was 4 mil (0.102 mm) thick polyethylene terephthalate sheet bearing on one major surface thereof an imageable layer prepared according to the procedure described below. All parts are parts by weight unless indicated otherwise.

A first solution containing (a) 5 parts silver behenate, (b) 40 parts acetone, and (c) 5 parts methyl ethyl ketone was ball milled for 24 hours. A second solution containing (a) 13.00 parts polyvinyl acetate resin, (b) 83.20 parts acetone, (c) 0.20 parts benzotriazole, (d) 0.60 parts tetrachlorophthalic anhydride, and (e) 3.00 parts methyl gallate was stirred until the resin had dissolved. Twenty parts of the first solution was combined with ten parts of the second solution, and the combination was stirred for 5 minutes with an air mixer. The imageable composition was coated over the polyethylene terephthalate sheet with a flat bed knife coater at 3.0 mil orifice and was dried in an oven at 82° C. for 2 minutes. A third solution containing 5 parts cellulose acetate butyrate resin and 95 parts acetone was stirred until the resin had dissolved. This solution was coated over the dried imageable composition with a knife coater at 2.0 mil orifice and was dried in an oven at 82° C. for 2 minutes. A fourth solution containing 7.5 parts polyvinyl butyral and 92.5 parts ethanol was coated over the cellulose acetate butyrate resin layer with a knife coater at 2.0 mil orifice and was dried in an oven at 82° C. for 2 minutes.

A composition for preparing a silicone polymer release coating was prepared from a formulation containing the following ingredients in the amounts indicated:

| Ingredient | Amount (parts by weight) |
|---|---|
| Resin (Syl-off ® 294) | 4.00 |
| Anchorage additive (Syl-off ® 297) | 0.25 |
| Heptane | 34.00 |
| Methyl ethyl ketone | 6.00 |
| Fast-cure additive (C4-2217) | 0.75 |
| Catalyst (Dow Corning ® XY-176) | 0.62 |

Heptane and methyl ethyl ketone were blended, and then, in order, were added the resin, the fast-cure additive, the anchorage additive, and the catalyst. The release coating composition was coated over the polyvinyl butyral layer by means of a knife coater at a 2 mil orifice. The coating was dried in an oven at 82° C. for 2 minutes.

The effectiveness of the release coating was determined through the measurement and comparison of the optical density of the image on the paper original prior to making a transparency, after making a transparency with thermally imageable film not treated with a silicone release coating, and after making a transparency with thermally imageable film treated with a silicone release coating. (A fresh original was used to prepare each transparency.) Originals were made on a Kodak Model 150 copier. Transparencies were made on a prewarmed 3M Model 45 Transparency Maker. The optical densities were measured with a MacBeth Model TR924 densitometer. The results in the following table represent the average of four samples.

TABLE V

| | Optical density | Standard deviation |
|---|---|---|
| Original | 1.21 | 0.08 |
| Untreated film | 0.98 | 0.22 |
| Treated film | 1.21 | 0.12 |

Loss of optical density and increase in standard deviation is observed when comparing the images on originals before and after imaging with untreated film. Loss of optical density results from toner particles being torn from the paper original. Because tearing away of toner particles is not uniform, the standard deviation increases. When treated film is used, no loss of optical density is observed. Furthermore, the standard deviation in only slightly higher than that of the original image, thus indicating the uniformity of image is about the same.

What is claimed is:

1. A film which can be imaged by thermal energy comprising:

(a) a substrate, (b) a layer of thermally imageable material coated on at least one major surface of said substrate, (c) an organopolysiloxane release coating, capable of releasing toner, coated over said layer of imageable material, said release coating being formed from a curable composition comprising a mixture of siloxanes consisting essentially of from 0.1 to 3% by weight of methylhydrogenpolysiloxane and from 97 to 99.9% by weight of a siloxane of the formula $$(CH_3)_xSiO_{\frac{4-x}{2}}$$

in which x has a value from 1.9 to 2 inclusive and in which siloxane substantially all of the molecules have attached thereto at least a total of two silicon-bonded hydroxyl groups and/or alkoxy groups of less than 5 carbon atoms, a catalyst, and a cross-linking agent, said curable composition being curable at a temperature under 70° C. with a curing exposure time of under 3 minutes.

2. The film of claim 1 wherein said film is transmissive to visible light.

3. The film of claim 1 wherein the substrate is a polymeric film.

4. The film of claim 3 wherein said polymeric film substrate is polyethylene terephthalate.

5. The film of claim 1 wherein the imageable material comprises a binder, nitrate salt, and at least one leuco dye.

6. The film of claim 1 wherein said catalyst is a dialkyltin salt.

7. The film of claim 6 wherein said catalyst is represented by the formula $$(C_4H_9)_2Sn(O\overset{\overset{O}{\|}}{C}R)_2$$

wherein R is $-CH(C_2H_5)(CH_2)_3CH_3$, $-CH_3$, or $-(CH_2)_{10}CH_3$.

8. The film of claim 1 wherein said cross-linking agent is a tetraalkoxysilane (silicate).

9. The film of claim 8 wherein said cross-linking agent is represented by the formula $$Si-O-CH_2-CH_2-OCH_2CH_2-OCH_3)_4.$$

10. The film of claim 1 further including an anchorage additive.

11. A film which can be imaged by thermal energy comprising:

(a) a substrate, (b) a layer of thermally imageable material coated on at least one major surface of said substrate, (c) an organopolysiloxane release coating, capable of releasing toner, coated over said layer of imageable material, said release coating being formed from a curable composition comprising a (1) a curable epoxypolysiloxane which is represented by the formula,

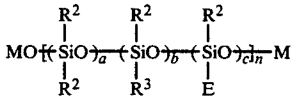

wherein $R^2$ is a lower alkyl group of one to three carbon atoms, $R^3$ is a monovalent hydrocarbon radical of 4 to 20 carbon atoms, E is a monovalent epoxy-containing hydrocarbon radical, M is a silyl group $R_3{}^2Si$—, $R_2{}^2R^3Si$—, or $R_2{}^2ESi$—, where $R^2R^3$ and E are defined above, a is 5 to 200, b is 0 or up to 20% of a, a+b is 5 to 200, c may be 0 when M is $R_2{}^2ESi$— or is greater than 0 but less than 20% of the value of (a+b) when M is $R_3{}^2Si$—, $R_2{}^2R^3Si$—, or $R_2{}^2ESi$—, and n is 1 to 75;

provided that the monovalent epoxy-containing hydrocarbon radical, E, contains at least one polymerizable epoxy group,

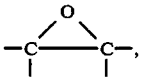

the remainder being composed of carbon and hydrogen free of acetylenic unsaturation and in addition to the oxirane oxygen can contain ether, —O—, or carbonyl oxygen,

and (2) 0 to about 98% by weight of the epoxypolysiloxane described in (1) of an epoxy-terminated silane wherein said epoxy-terminated silane is represented by the formula, $(E)_{4-p}Si(OR^4)_p$, wherein E is an epoxy-containing monovalent hydrocarbon radical defined above, p is 1 to 3 and $R^4$ can be an aliphatic hydrocarbon radical of less than 10 carbon atoms, and an effective amount of an epoxy curing catalyst, said curable composition being curable at a temperature under 70° C. with a curing exposure time of under 3 minutes.

12. The film of claim 11 wherein said catalyst is a complex of antimony pentachloride and dimethyl methyl phosphonate.

13. Method of preparing a transparency by means of a thermal imaging process comprising the steps of (a) contacting an image-bearing original with the transparent film of claim 2, (b) applying thermal energy to the original whereby the original imagewise absorbs said thermal energy and transfers said thermal energy to the transparent film to form a copy of the image of the original on the transparent film, and (c) separating said original from said transparent film.

* * * * *

UNITED STATES PATENT AND TRADEMARK OFFICE

CERTIFICATE OF CORRECTION

PATENT NO. : 4,567,133

DATED : January 28, 1986

INVENTOR(S) : RUSSELL R. ISBRANDT and CHUNG I. YOUNG

It is certified that error appears in the above-identified patent and that said Letters Patent is hereby corrected as shown below:

Col. 1, line 31 "polmer" should read --polymer--.

Col. 8, line 64 "mosture" should read --moisture--.

Signed and Sealed this

*Twenty-ninth* Day of *April 1986*

[SEAL]

*Attest:*

DONALD J. QUIGG

*Attesting Officer* *Commissioner of Patents and Trademarks*

UNITED STATES PATENT AND TRADEMARK OFFICE

CERTIFICATE OF CORRECTION

PATENT NO. : 4,567,133

DATED : January 28, 1986

INVENTOR(S) : Russell R. Isbrandt and Chung I. Young

It is certified that error appears in the above-identified patent and that said Letters Patent is hereby corrected as shown below:

Col. 12, line 38 "(50.8m)" should read --(50.8μm)--.

Signed and Sealed this

*Twentieth* Day of *May 1986*

[SEAL]

*Attest:*

DONALD J. QUIGG

*Attesting Officer* *Commissioner of Patents and Trademarks*